United States Patent
Famy et al.

(10) Patent No.: US 6,875,503 B1
(45) Date of Patent: Apr. 5, 2005

(54) CEMENTITIOUS PRODUCT IN PANEL FORM AND MANUFACTURING PROCESS

(75) Inventors: Charlotte Famy, Chantilly (FR); Gaël Cadoret, Paris (FR); Paul Houang, Paris (FR)

(73) Assignee: Saint-Gobain Materiaux de Construction S.A.S., Courbevoie (FR)

( * ) Notice: Subject to any disclaimer, the term of this patent is extended or adjusted under 35 U.S.C. 154(b) by 40 days.

(21) Appl. No.: 10/682,109

(22) Filed: Oct. 10, 2003

(30) Foreign Application Priority Data

Sep. 15, 2003 (FR) .............................. 03 10813

(51) Int. Cl.[7] .............................. B32B 27/12
(52) U.S. Cl. .............................. 428/297.4; 428/294.7; 428/296.4; 428/454; 428/404; 428/325; 428/332
(58) Field of Search .............................. 428/404, 454, 428/325, 294.7, 297.4, 332, 296.4

(56) References Cited

U.S. PATENT DOCUMENTS

| | | | |
|---|---|---|---|
| 4,306,911 A | * | 12/1981 | Gordon et al. .............. 106/644 |
| 4,350,567 A | * | 9/1982 | Moorehead et al. ........ 162/145 |
| 6,676,745 B2 | * | 1/2004 | Merkley et al. ............ 106/726 |
| 2002/0059886 A1 | | 5/2002 | Merkley et al. |
| 2002/0112827 A1 | | 8/2002 | Merkley et al. |
| 2002/0166479 A1 | | 11/2002 | Jiang |

FOREIGN PATENT DOCUMENTS

| | | |
|---|---|---|
| EP | 0 263 723 | 4/1988 |
| EP | 1 227 199 | 7/2002 |
| GB | 1 543 460 | 4/1979 |
| WO | WO 02 32830 | 4/2002 |
| WO | WO 02 33164 | 4/2002 |

OTHER PUBLICATIONS

*Wood–Cement Composites in the Asia–Pacific Region*, Proceedings of a workshop held at Rydges Hotel, Canberra, Australia, on Dec. 10, 2000, Chapters 1–3, pp. 1–46, 48–128, and 130–165.

* cited by examiner

*Primary Examiner*—Merrick Dixon
(74) *Attorney, Agent, or Firm*—Oblon, Spivak, McClelland, Maier & Neustadt, P.C.

(57) ABSTRACT

The present invention relates to a product in panel form, comprising a fiber-reinforced cementitious matrix, prepared from a sheet material by filtration on a screen of an aqueous suspension comprising at least one hydraulic binder, such as cement and at least one fibrous material and devoid of siliceous sand, thicknesses of said sheet material being superposed until the desired final thickness is obtained, in order to give a panel which is then autoclaved.

The invention also relates to a process for manufacturing the product.

11 Claims, No Drawings

CEMENTITIOUS PRODUCT IN PANEL FORM AND MANUFACTURING PROCESS

The present invention relates to the field of the manufacture of products based on cement (generally Portland cement) or other hydraulic binder reinforced with fibers. It relates more particularly to the manufacture of products in panel (or sheet or plate or slab or board) form, that can be used as building elements, especially as roofing articles, weather-boards, cladding panels, boardings, sidings or shingles.

These products are usually manufactured using a wet papermaking technique that utilizes the presence of the fibers in the mixture. This technique consists in forming a sheet likenable to a paper, by filtration using a fluid aqueous suspension obtained by essentially mixing cement, fibers and water; the sheet, or possibly a superposition of sheets, then being drained of water by suction and/or pressure. The fibers, generally cellulose fibers, hold to the filter (or sieve), forming an additional screen or filter mesh, the mesh cells of which have a size suitable for retaining the particles, even fine particles, of cement or of other binder or additive, together with an important amount of water, the latter contributing to the cohesion of the thick layer being formed on the screen.

In one particular technique, the filter (or sieve) consists of a drum covered with a filter cloth (or felt) installed in a tank (or vat) containing the suspension; since the drum rotates in the tank, the hydrostatic pressure forces some of the water to pass through the felt, whereas the solids, that is to say notably the cellulose fibers, the cement particles and other additives, build up on the screen of the drum as a thin layer whose thickness increases with the rotation of the drum. This is known as the Hatschek technique.

For cladding products or sidings, the material in panel form does not have the necessary mechanical strength and in most cases it undergoes an autoclaving treatment at high temperature (above 150° C.) and high pressure (saturation pressure of the order of a few bar), possibly after it has undergone a first mechanical pressing operation (by a forming drum -or format roll-and/or in a press).

The composition of the mixture mainly comprises Portland cement, cellulose fibers and ground siliceous sand (sometimes called ground silica). During the autoclaving treatment, this ground sand reacts with the constituents of the cement to give a stabilized matrix, which exhibits little dimensional variation according to the variation in moisture content, and better mechanical strength, in which the cellulose fibers provide additional mechanical reinforcement.

Such products are described for example in document EP 1 227 199.

However, the inclusion of ground sand requires industrial plants to be provided with specific grinding means that involve many constraints in terms of maintenance, storage and operating cost. The object of the invention is to propose novel formulations that can result in acceptable mechanical and/or dimensional stability performance characteristics while limiting the drawbacks relating to the use of ground sand.

In this regard, the subject of the invention is a product in panel form comprising a fiber-reinforced cementitious matrix, prepared from a sheet material by filtration on a screen of an aqueous suspension comprising at least one hydraulic binder, such as cement (in particular Portland cement), and at least one fibrous material, thicknesses of said sheet material being superposed until the desired final thickness is obtained in order to give a panel, which is then autoclaved, in which the matrix is devoid of (or is without or contains no) siliceous sand.

In the present patent application, the term "siliceous sand" is understood to mean the material also known as "ground silica", generally prepared on site by grinding quartz-type sand.

In fact, since it has been observed that the size reduction owing to the operation of grinding the siliceous sand is accompanied by at least partial amorphization of the particles of material, thereby giving it enhanced reactivity with respect to the cement, the desired properties, such as the mechanical strength properties, may especially be advantageously obtained by substituting the siliceous sand with a reactive material that can induce the same reaction with cement, by the formation of calcium silicate.

Thus, it may be advantageous to use, as total or partial replacement for the siliceous sand, at least one pozzolan (or pozzolana) or a material capable of undergoing a pozzolanic reaction, this pozzolan or material being in particular chosen from aluminosilicates, calcium aluminosilicates and amorphous silica. It is particularly advantageous to use metakaolin, which is a dehydroxylated form of aluminium silicate, or fly ashes from thermal power stations, which are materials of the aluminosilicates or calcium aluminosilicates (type F or C according to the ASTM C618 standard) type, or another active material of the type of rice husk ashes, which are based on one amorphous form of silica, or also possibly slag (blastfurnace slag) from ironwork which is a material of the calcium aluminosilicate type.

At least some of the siliceous sand may also be replaced with calcium carbonate, especially as a complement of the pozzolan when the latter is used only as partial replacement for the siliceous sand.

In a preferred embodiment, the matrix is obtained from a suspension advantageously comprising (relative to the total weight of dry matter):
  from 0 to 36%, preferably 0 to 30% and especially 15 to 27% by weight of calcium carbonate;
  from 50 to 95%, especially 60 to 90%, by combined weight of cement and pozzolan;
  from 5 to 12%, preferably 5 to 10% and especially 7 to 9% by weight of fibers; and
  from 0 to 10%, especially 0 to 5%, by weight of additives.

Preferably, the cement/pozzolan weight ratio is about 1.3 to 2.6, advantageously about 1.4 to 2.4, and/or the pozzolan (or pozzolanic material) content in the matrix is less than 40% and advantageously is between 15 and 40%.

The pozzolan has preferably a particle size distribution characterized by a mean diameter ($D_{50}$) of greater than 1 $\mu$m and less than or equal to 50 $\mu$m, preferably about 10 to 30 $\mu$m. These powders generally have a specific surface area of about 10 to 50 $m^2/g$ (measured by the BET method).

The fibers advantageously comprise plant fibers, especially cellulose fibers refined to an SR° (Schopper-Riegler degree) of advantageously about 20 to 70, or 30 to 60, particularly from pine but also from sisal or other.

The additives may be chosen especially from fillers such as kaolin, etc. and/or flocculants and/or other adjuvants of the aqueous suspension.

The product according to the invention is advantageously in the form of a siding or a cladding element.

The subject of the invention is also a process for manufacturing the above product, characterized in that a sheet material is prepared by filtration on a screen of an aqueous suspension comprising at least cement and fibers, thicknesses of said sheet material are superposed until the desired final thickness is obtained in order to give a panel, and the panel is subjected to an autoclave treatment. In an advantageous method of implementation, the temperature in the autoclave is about 160 to 180° C. and the pressure in the autoclave is about 7 to 10 bar (saturation pressure).

Optionally, the panel may undergo other treatments—for example, it may be formed and/or printed, for example, it may be molded, notably when it is still in a malleable form before the autoclave treatment, in particular in order to obtain a corrugated or nonplanar panel.

The following examples 1 to 3 illustrate the invention, in comparison with the reference example below.

REFERENCE EXAMPLE

This example illustrates the prior art with a formulation based on ground silica. More precisely, the matrix was prepared from a suspension having the following composition by weight of dry matter:

36.4% standardized (CEM I 52.5) Portland cement;
51% ground silica with a $D_{50}$ of 30 $\mu$m;
4% kaolin supplied by Ione Minerals; and
8.6% unbleached pine cellulose fibers refined to 30° Schopper-Riegler.

Example 1

In this example, the matrix was prepared from a suspension having the following composition by weight of dry matter:

61.2% standardized (CEM I 52.5) Portland cement;
26.2% metakaolin sold under the reference METASTAR 501 by Imerys;
4% kaolin supplied by Ione Minerals; and
8.6% unbleached pine cellulose fibers refined to 30° Schopper-Riegler.

The cement/pozzolan weight ratio was 2.34.

1. Manufacture of the Specimens

Fiber cement panels were manufactured by the "handmade sheet" process (or "formette" process), which is a laboratory process that simulates the Hatschek process and makes it possible to manufacture fiber cement panels having chemical and physical characteristics similar to those of panels manufactured by the Hatschek process. The results may also be verified by another method of preparing the specimens, using a Hatschek line of reduced size for the laboratory.

A dilute aqueous suspension of the above-mentioned matrix constituents, with the addition of 0.04% of an anionic polyacrylamide flocculant (solids content relative to the dry matter, cellulose included, of the dilute aqueous fiber cement suspension), was prepared.

The manufactured panels measured 260×260 mm and had the same thickness (8 mm±1 mm) as those produced on an industrial scale. They were formed from several (between 7 and 9) monolayers superposed in the fresh state and obtained by filtration of the dilute fiber cement suspension in a so-called "formette" apparatus. When these monolayers had been superposed to form a panel, the latter was pressed so as to remove a certain amount of water and to increase the adhesion of the monolayers to one another. This pressing step simulated the pressure exerted by the forming drum in the Hatschek process. The pressing was carried out by placing the fiber cement panel in the fresh state between two stainless steel plates. The assembly was placed between the plates of a press and a pressure of 30 bar was applied to this panel for 30 minutes.

Cure (Maturing)

The panel specimens were subjected to cure (or maturing) conditions identical to those used in an industrial environment.

The pressed panels were precured in an oven at 60° C. and 100% relative humidity for 8 hours. This precure was followed by autoclaving under the following conditions:

(a) pressure rise to 8.8 bar over 3 hours; (b) pressure hold at 8.8 bar for 6.5 hours; and (c) slow pressure drop over 2.5 hours.

After the autoclaving, the panels were packaged in seal (or impermeable) plastic bags, sealed by heat-sealing, and placed in an oven at 40° C. for 6 days in order to complete their cure. At the end of cure, the panels were cut up and characterized in respect of their mechanical properties.

2. Characterization

The characterization of the formettes was carried out on the model of procedures specified in the ASTM C1185 standard.

Determination of the Three-Point Bending Strength or MOR (Modulus of Rupture):

Size of the test pieces: 190×50 mm.

The bending strengths were determined on both (a) test pieces (or samples) immersed for 24 hours in water at 20° C. (saturated MOR) and (b) test pieces which were dried at 20° C. and 60% relative humidity (dry MOR). The final bending strength value is an average from four test pieces.

Shrinkage or Moisture Movement:

Size of the test pieces: 203.1×76.2 mm.

The length of the test piece was measured after it had been immersed in water for 48 hours and after it had been dried at 105° C. in an environmental chamber. The length of the test piece dried at 105° C. was measured when the mass of the test piece was constant to within 0.1%. The final shrinkage value was a mean value from two test pieces.

The results of the evaluations are given in table 1 below, together with the results from following examples.

Example 2

In this example, the matrix was prepared from a suspension having the following composition by weight of dry matter:

36.4% standardized (CEM I 52.5) Portland cement;
15% metakaolin sold under the reference METASTAR 501 by Imerys;
4% kaolin supplied by Ione Minerals;
8.6% unbleached pine cellulose fibers refined to 300 Schopper-Riegler; and
36% calcium carbonate.

The cement/pozzolan weight ratio was 2.42.

Example 3

In this example, the matrix was prepared from a suspension having the following composition by weight of dry matter:

36.4% standardized (CEM I 52.5) Portland cement;
20% metakaolin sold under the reference METASTAR 501 by Imerys;
4% kaolin supplied by Ione Minerals;
8.6% unbleached pine cellulose fibers refined to 30° Schopper-Riegler; and
31% calcium carbonate.

The cement/pozzolan weight ratio was 1.82.

TABLE 1

| Ex. | Kaolin (%) | Silica (%) | Cement (%) | Cellulose (%) | MK (%) | CaCO$_3$ (%) | Saturated MOR (MPa) | Dry MOR (MPa) | Shrinkage (%) |
|---|---|---|---|---|---|---|---|---|---|
| Ref. | 4 | 51 | 36.4 | 8.6 | 0 | 0 | 6.5 | 10.4 | 0.17 |
| 1 | 4 | 0 | 61.2 | 8.6 | 26.2 | 0 | 6.1 | 8.8 | 0.19 |
| 2 | 4 | 0 | 36.4 | 8.6 | 15 | 36 | 3.4 | 5.5 | 0.11 |
| 3 | 4 | 0 | 36.4 | 8.6 | 20 | 31 | 4.6 | 6.7 | 0.15 |

The shrinkage performance of the panels prepared from formulations 1 to 3 that do not contain ground silica is similar to that of the control panels that do contain ground silica.

In addition, the mechanical performance in terms of bending strength of the panels prepared from formulation 1 is similar to that of the control panels that do contain ground silica.

A good compromise in terms of mechanical performance is also obtained in the embodiments of the invention in which the pozzolan is combined with a filler such as calcium carbonate, and/or with another pozzolan.

The following examples 4 and 5 also illustrate these other formulations according to the invention.

Example 4

In this example, the matrix was prepared from a suspension having the following composition by weight of dry matter:

61.2% standardized (CEM I 52.5) Portland cement;
26.2% fly ash sold by Surchiste;
4% kaolin supplied by lone Minerals; and
8.6% unbleached pine cellulose fibers refined to 300 Schopper-Reigler.

The cement/pozzolan weight ratio was 2.34.

Example 5

In this example, the matrix was prepared from a suspension having the following composition by weight of dry matter:

36.4% standardized (CEM I 52.5) Portland cement;
25% fly ash sold by Surchiste;
4% kaolin supplied by lone Minerals;
8.6% unbleached pine cellulose fibers refined to 300 Schopper-Reigler; and
26% calcium carbonate.

The cement/pozzolan weight ratio was 1.45.

The product according to the invention may be used as siding, cladding elements, etc. and may be flat or corrugated, etc.

What is claimed is:

1. A product in panel form, comprising a fiber-reinforced cementitious matrix, prepared from a sheet material by filtration on a screen of an aqueous suspension comprising at least one hydraulic binder, such as cement, at least one fibrous material and devoid of siliceous sand, thicknesses of said sheet material being superposed until the desired final thickness is obtained, in order to give a panel which is then autoclaved.

2. The product as claimed in claim 1, wherein the matrix comprises at least one pozzolan or material capable of undergoing a pozzolanic reaction, this pozzolan optionally containing silica in which preferably said silica essentially consists of amorphous silica.

3. The product as claimed in claim 1 or 2, wherein the pozzolan or pozzolans are chosen among aluminosilicates, calcium aluminosilicates and amorphous silica.

4. The product as claimed in claim 3, wherein at least one pozzolan is chosen from metakaolin, fly ashes, rice husk ashes, or slag.

5. The product as claimed in one of the preceding claims, wherein the matrix furthermore includes calcium carbonate.

6. The product as claimed in one of the preceding claims, wherein the matrix is obtained from a suspension having relative to the total weight of dry matter):

from 0 to 36 by weight of calcium carbonate;
from 50 to 95% by combined weight of cement and pozzolan;
from 5 to 12% by weight of fibers; and
from 0 to 10% by weight of additives.

7. The product as claimed in one of claims 2 to 6, wherein the cement/pozzolan weight ratio is about 1.3 to 2.6 and/or the pozzolan content is less than 40% by weight.

8. The product as claimed in any one of the preceding claims, wherein the fibers comprise at least plant fibers, especially cellulose fibers.

9. The product as claimed in any one of the preceding claims, and which is in the form of a siding or cladding element.

10. A process for manufacturing a product as claimed in any one of the preceding claims, wherein a sheet material is prepared by filtration on a screen of an aqueous suspension comprising at least cement and fibers, thicknesses of said sheet material are superposed until the desired final thickness is obtained, in order to give a panel, and the panel is subjected to an autoclave treatment.

11. The process as claimed in claim 10, wherein the temperature in the autoclave is about 160 to 180° C. and the pressure in the autoclave is about 7 to 10 bar.

* * * * *